Nov. 4, 1952

W. VAN HEECKEREN ET AL 2,616,522

LUBRICATING MEANS FOR RECIPROCATORY
MEMBER IN A HIGH-PRESSURE CHAMBER
AND BLOWOFF MEANS THEREFOR

Filed April 27, 1948

WILLEM VAN HEECKEREN
GEORGE W. MEADOWS
BURTON A. JACOBSON
INVENTORS

By E. F. Wenderoth

ATTORNEY

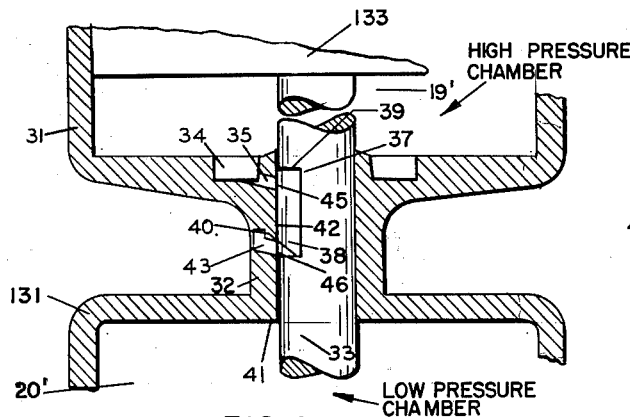

Patented Nov. 4, 1952

2,616,522

UNITED STATES PATENT OFFICE 2,616,522

LUBRICATING MEANS FOR RECIPROCATORY MEMBER IN A HIGH-PRESSURE CHAMBER AND BLOWOFF MEANS THEREFOR

Willem Van Heeckeren, Dobbs Ferry, George W. Meadows, Irvington-on-Hudson, and Burton A. Jacobson, Dobbs Ferry, N. Y., assignors to Philips Laboratories, Inc., Irvington-on-Hudson, N. Y.

Application April 27, 1948, Serial No. 23,584

9 Claims. (Cl. 184—24)

This invention relates to piston, piston rod, and cylinder construction and more particularly to controlling the lubricating fluid of a piston, piston rod, and cylinder assembly of an engine or compressor.

It has been found that in the normal operation of a piston and cylinder assembly the lubricating fluid for the piston and cylinder is subject to a pumping action which causes the fluid to flow to the top of the piston head and into the working chamber of the engine. The lubrication so displaced into the working chamber of an engine usually produces a carbon and gum residual, which adversely effects the operating efficiency of the engine, while such lubrication in the work medium of a compressor also detracts from the good performance of the compressor.

In pistons having piston rings, it has been found that the said pumping action is brought about by the necessity of providing a sufficient clearance between the walls of the piston ring grooves and the piston rings to allow normal expansion of these elements in the operation of the engine. Because of this clearance, the rings move relative to the grooves and this movement is a maximum at approximately 30° to 15° before dead center of movement of the piston. This movement of the ring particularly at the top dead center position of the piston causes the lubricant, which has found its way into the clearance space between ring and groove to be forced therefrom. As the piston reciprocates during operation, the continual repetition of such action causes a build-up of lubricant above the piston and in the working chamber, to an excessive amount thereby bringing about the formation of carbon and gum residual pointed out above.

A similar phenomenon has been found to exist in connection with the operation of piston rods. That is, the oil applied to the rod for lubricating purposes, even though no rings are present, works its way out of the piston rod bushing and into the chambers at either end thereof due to the adhesion of the oil to the rod and to the reciprocatory motion thereof. In the case of pressure chambers which operate at high temperatures, such, for example, as the working chamber in a hot-gas piston engine, accumulations of oil in the chamber are detrimental to the operation thereof as noted above in the discussion of the problem with regard to ringed pistons. A further problem is encountered in hot-gas engines in those cases where oil finds its way into the working medium of the engine in that the regenerator becomes fouled.

While as stated above, the problem of preventing oil used for lubricating the piston rod from entering the system exists, a concomitant problem is assuring that the piston rod, on the other hand, is properly lubricated at all times. That is, while the oil may enter the systems to so foul it, a drying action on the rod and its lubricating supply is a resultant of the action of the hot gases in the working chamber on the said supply.

One object of this invention is to provide a piston, piston rod, and cylinder construction which will prevent build-up of lubricant above the piston and in the working chamber of an engine or compressor.

A further object of this invention is to eliminate the possibilities of carbon and gum deposits in the working cylinder of an engine or compressor.

Another object of this invention is to provide for a lubrication controlled piston, piston rod and cylinder construction which is simple in structure and reliable in operation.

Another object of this invention is to eliminate excess oil from a pressure chamber by utilization of the pressure therein.

Another object of this invention is to use the pressure in a working chamber to blow-off the oil therein once each reciprocatory cycle of the piston and piston rod.

Still another object of this invention is to provide means for causing the blow-off to proceed in stages to prevent atomization of the discharged oil.

Still another object of this invention is to provide a positive means for continuously oiling the reciprocating piston rod.

Still another object of this invention is to provide means for preventing gases flowing in an associated working chamber from having a drying action on the piston rod lubricating well.

Still another object of this invention is to provide means for wiping the piston rod once each reciprocatory cycle thereof.

Still another object of this invention is to provide a single means for accomplishing the functions of the two means described in the two paragraphs immediately preceding.

To these and other ends the invention consists in certain improvements and combinations of parts all as will be more fully discussed hereafter by reference to the drawings wherein:

Fig. 4 is a vertical cross-sectional partial view of a cylinder and piston rod assembly having staged blow-off means in accordance with another form of the invention and showing the piston rod in the top dead center position.

Fig. 5 is the same vertical cross-sectional partial view shown in Fig. 4, but with the piston rod at bottom dead center position.

Fig. 6 is a vertical cross-sectional partial view of a cylinder, piston and piston rod assembly showing the relationship of lubricating means, baffle means, wiper means, and staged blow-off means in the same organization according to another form of the present invention.

Fig. 7 is a detail vertical cross-sectional view of the rod and bushing shown in Fig. 6, but in an intermediate position of the rod in the bushing.

Fig. 8 is a detail vertical cross-sectional view of the rod and bushing similar to that shown in Fig. 7 but with the rod in the bottom dead center position.

Fig. 9 is a detail vertical cross-sectional view of an alternate form of the baffle means and wiper means shown in Fig. 6.

In accordance with one application of the invention, several of the foregoing objects are realized by means of a cylinder having its internal wall provided with a peripheral annular groove at the region of the top of the piston travel and a longitudinal groove extending from the said annular groove to a point of the cylinder surface below the position of the rings at the top of the piston stroke. The piston is provided with an aperture which connects with the bottom of the longitudinal groove at the top of the piston movement. In the foregoing arrangement the annular groove serves as an accumulator for any lubricant which is driven out from the top piston ring due to the deceleration force on the rings as the piston approaches top dead center, the so collected lubricant thus being prevented from continuing on into the working space above the piston. The longitudinal groove serves as a relief drain for the accumulated lubricant and by means of the aperture in the piston, the lubricant is returned to the bottom side of the piston. In this manner the working space above the piston is in open communication with the crankcase space below the piston when the piston is in top dead center position, and at that instant the pressure differences existing between said spaces, forces the lubricant from the accumulator groove to the engine crankcase.

In order that the invention may be more clearly understood it will now be described with reference to the accompanying drawing, which shows by way of example, several embodiments thereof.

Figure 1:
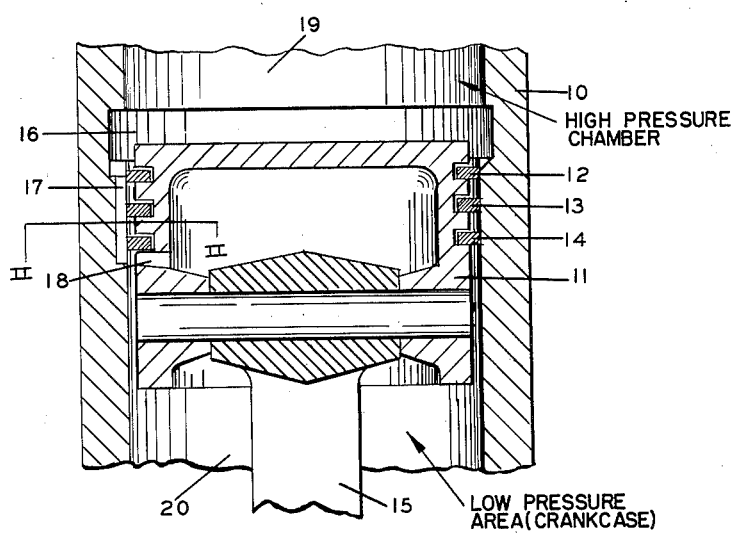
Fig. 1 is a vertical cross-sectional partial view of a cylinder and piston assembly in accordance with one form of the invention.
Figure 2:
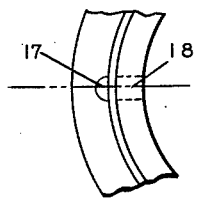
Fig. 2 is a cross-sectional view taken along the line II—II of Fig. 1.

In Fig. 1 the piston is shown approaching top dead center position. Numeral 10 indicates a cylinder (shown in part) having a wall portion in which is slidably arranged a piston 11, which has piston rings 12, 13 and 14, the rings having a certain amount of clearance with the piston ring grooves as indicated in the drawing. The piston is connected to a connecting rod 15 in the usual manner as shown. Numeral 19 indicates a high pressure volume above the piston while numeral 20 indicates a portion of the crankcase volume below the piston which is at a lower pressure than the volume 19. The cylinder 10 is provided with an annular groove 16 extended about the inner surface of the cylinder, and is positioned so that approximately one-half the height of piston ring 12 passes above the lower edge of the groove as shown, when the piston 11 is in top dead center position. A second groove 17 extends downwardly along the inner wall of the cylinder to a distance slightly below piston ring 14, the lower end being in alignment at top dead center with a hole 18 radial positioned in the piston wall. If found desirable several groove and hole arrangements like 17 and 18 can be provided. For the purpose of clarification, the clearance between the piston outside diameter and the cylinder inside diameter is exaggerated, however, in actual practice a clearance of only a few thousandths of an inch is maintained.

As the piston approaches top dead center position due to the deceleration force, the piston rings are forced to the top of the piston ring groove and lubricant is forced out from the top of piston ring 12. This lubricant accumulates in the groove 16 and due to a pressure differential existing between the spaces 19 and 20, is delivered to the engine crankcase by means of groove 17 and hole 18, during the time that the piston is at top dead center position.

Figure 3:
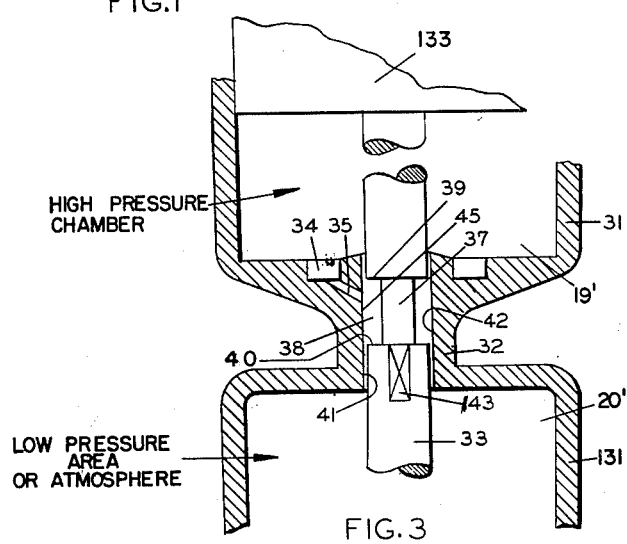
Fig. 3 is a vertical cross-sectional partial view of a cylinder, and piston rod assembly having blow-off means in accordance with another form of the invention.

The principles of the blow-off system just described may be applied to a piston rod or reciprocable member which reciprocates into a high pressure chamber, such, by way of example only, as the chamber of a hot-gas piston engine or the chamber of a compressor. Fig. 3 shows an embodiment of the invention as applied to a hot-gas piston engine. Numeral 31 designates the casing of the high pressure chamber 19' of the engine. The casing 31 has integrally formed therewith a bushing 32 having a bore 42 in which is slidably mounted a piston rod 33. Piston rod 33 may be operatively connected at the upper end thereof with a piston 133 which reciprocates in the casing 31 under the action of a hot gas under pressure therein in known manner. The other end of the piston rod 33 may be connected to a crankshaft (not shown) located in a crankcase area 20' defined by a conventional casing 131 shown in part. Area 20' is at a pressure lower than that obtaining in chamber 19' and may be atmospheric. The purpose of the crankshaft, of course, is for taking off the power developed against the piston 33. The reciprocating piston rod 33 may be lubricated by oil in the region of bushing bore 42 by conventional means (not shown) such as a splash means for the bottom of the rod. The tendency is for the lubricating oil to work out over the surface of the reciprocating piston rod 33 to form menisci at the top and bottom edges of the bushing to reach a theoretical state of equilibrium. However, if oil from the top meniscus is allowed to flow away sideways, as over the floor of the chamber 31, this equilibrium will never occur and there will be a constant pumping of oil upwards. Since oil in the working medium is deleterious to the proper operation of a hot-gas piston engine, the following structure is provided to remove the accumulated oil from the casing 31.

A well 34 is provided in the bottom of the casing 31. By gravity, oil accumulations in casing 31 run into well 34. Connected to the bottom of the well 34 is a downwardly inclined drain channel 35 which opens into the bore 42 of the bushing 32 at 45. A section 37 of less diameter than the remainder of rod 33 is provided therein to form, with edges 39 and 40 and the wall of the bore 42, a pocket 38. Pocket 38 has in communication therewith a vent channel 143. As shown in Fig. 3, with the piston rod 33 at the top-most position of the reciprocatory cycle thereof, drain channel 35 is in communication with pocket 38. In this position, the gas pressure in casing 31 forces the liquid oil accumulation in well 34 together with pressured gas down through channel 35 into pocket 38 and thence to atmosphere or the crankcase area 20' as the case may be, via vent channel 143. As the reciprocating piston rod 33 moves downwardly, edge 39 moves below the channel opening 45 so that pocket 38 is no longer in communication therewith and pressure is no longer vented from casing 31.

The action described above is repeated each reciprocatory cycle of the piston rod 33. With this so-called straight blow-off arrangement, the amount of hot gas escaping with the oil depends upon the time the pocket 38 is in communication with the drain channel 35, the cross-section of the various passages, and the viscosity of the oil. Since its application, therefore, seems limited to constant engine speeds and not too wide variations of viscosity, a construction such as shown in Figs. 4 and 5 has been devised so that the invention may not be so limited.

Generally, the arrangement may follow that illustrated in Fig. 3. Like numerals have been used to designate similar elements in Figs. 4 and 5. The salient points of structural difference will now be set forth. Located below drain channel 35 is an accumulator pocket 43 having an opening 46 in bore 42 at a distance from the opening 45 of the drain channel 35 into said bore 42 which is less than the distance between edges 39 and 40 of pocket 38. Bushing 32 extends below opening 46 of accumulator pocket 43 to end at edge 41 at a distance therefrom which is also less than the distance between edges 39 and 40. As seen in Fig. 4, when the rod 33 is at the top dead center position shown, pressured gas and oil are forced into pocket 38 and accumulator 43 until the pressure of the chamber 31 is reached. Then, no more pressure escapes from chamber 31, except, of course, for leakages past abutting parts, which need not concern us here. In the position shown in Fig. 5, rod 33 is shown in the bottom dead center position. In that position, opening 45 is sealed off by the thicker portion of rod 33. At the same time, pocket 38 is at a position where edge 39 is above the lower edge of opening 46 and edge 40 is below bushing edge 41. In such position, the pressured gas and oil in accumulator pocket 43 and pocket 38 is vented to lower pressure area 20'.

It has been observed in a construction as shown in Figs. 4 and 5 and described above that the ultimate venting of the full pressure of the pressure chamber at the time edge 40 moves below edge 41 results in the atomizing of the oil contained in pocket 38. The atomized oil may be blown forcefully throughout the crankcase area 20' to contaminate the walls 131 thereof and the working parts therein (not shown). Figs. 6, 7 and 8 show an arrangement according to the invention for obviating this last-mentioned difficulty. Other improvements are shown as well as will be apparent from the description given hereinafter.

Similar to the arrangements described previously, a casing 31 defining a pressure chamber 19' of a hot-gas engine, for example, has attached thereto a bushing 32 in which a rod 33 reciprocates. Casing 31 has a well 34 for collecting excess oil which has worked up into the pressure chamber 19' by the reciprocable action of the rod 33 as described hereinbefore. Rod 33 is lubricated by lubricating means comprising conduit 50 leading from an oil supply (not shown) and the glycerine sight feed device 51, for example, through which the oil bubbles upwardly. Conduit 50 is connected to well 34 by passage 52. Well 34 has the channel 35 connected thereto which opens into bore 42 for oiling the rod 33 as well as for performing the oil blow-off function described in connection with the modifications set forth previously. For the last function, there is provided the smaller diameter portion 37 of rod 33 defining with edges 39 and 40 the pocket 38. Below opening 45 of drain channel 35 there is an accumulator pocket 43 having an opening 46 in bore 42 of bushing 32. Further down along elongated bushing 32 there is a second accumulator pocket 49 also having an opening 53 in bore 42. Bushing 32 ends at edge 41 a substantial distance below opening 53. The distances between 45 and 46 and 53, and 53 and edge 41 are proportioned with relation to edges 39 and 40 so that when when rod 33 is at the top dead center position shown in Fig. 6, the pressure chamber in casing 31 is in communication with pocket 38 and accumulator 43 via well 34 and channel 35 so that accumulated oil is forced into the said pocket 38 and accumulator 43 and the full operating pressure obtains therein. After rod 33 moves downwardly a short distance, edge 39 reaches a position below opening 45 whereby the pressure chamber is sealed. The pressured gas and oil in chamber 38 is displaced at substantially constant volume and pressure as rod 33 continues to move downwardly. As rod 33 continues to move downwardly, edge 40 reaches a position below opening 53 as shown in Fig. 7; the volume contained in pocket 38 and accumulator 43 is thus permitted to expand with consequent reduction in pressure. Rod 33 continues its downward movement until edge 40 is below edge 41 at the bottom dead center position of rod 33 in the bushing 32 as shown in Fig. 8. In the position shown, the gas and oil in pocket 38, now at a reduced pressure, is vented into the lower pressure area defined by casing 131. The function is repeated each reciprocatory cycle of the rod.

During the operation of the apparatus, the pressured hot gas in the chamber 31 may impinge on the oil in the well 34 to so result in a drying action. To prevent this action which may cause inadequate oiling of the rod as well as contamination of the working gas, a baffle 47 is provided which substantially covers the well 34 up to the rod 33 and forms a quiescent chamber therebelow. Sufficient clearance is provided to prevent rubbing of the rod 33 by the baffle 47 and also to permit pressure communication between chamber 31 and the well 34. To augment the flow of excess oil off piston rod 33 back into well 34, the top edge portion of the bushing 33 is beveled as at 48 to present a sharp edge. In this way a scraping action is assured each downward movement of the rod 33.

A modification of the baffle and scraper arrangement is shown in Fig. 9. In Fig. 9, like numerals designate like elements as in the other figures. However, instead of a separate baffle and a separate scraper, as shown in Figs. 6, 7 and 8, a single means is provided for performing the functions thereof. Thus, a felt washer 54 is fitted into a recess 55 in the bottom of casing 31. An edge of the washer abuts the surface of rod 33 at 56 to act as a wiper. The oil accumulated in the felt washer is periodically blown off downwardly via channel 35 in the manner described hereinbefore. The felt washer thus never becomes completely saturated and the pores therein at the top thereof are therefore only filled with air. According to the invention, only the pores at the top of the felt washer which are filled with air, as explained above, are exposed to the hot gas in the chamber 31. In this manner, the pores act as a multiplicity of baffles and quiescent chambers and the drying action is prevented.

While only several embodiments of the invention have been shown herein, it is obvious that variations may be made without departing from the spirit of invention.

What is claimed is:

1. A device for blowing off excess lubricating oil from a high pressure chamber of a hot gas piston engine comprising a hollow casing, a reciprocatory member in said hollow casing having a reduced portion, means forming a high pressure chamber at one end of said casing, groove means in said high pressure chamber for collecting excess oil coming off said reciprocatory member, channel means in said casing having an inlet in communication with said groove means, said channel means having an outlet opening internally of said casing at a point between said high pressure chamber and said lower pressure chamber, said reciprocatory member having passageway means therein which has an inlet which aligns with said channel means outlet only when said reciprocatory member is at the closest position to said high pressure chamber during the reciprocatory movement and an outlet in communication with said lower pressure chamber at least during the time when said reciprocatory member is away from said closest position, whereby a blow-off of pressure and oil from said high pressure chamber to said lower pressure chamber is obtained once each reciprocatory cycle, said outlet in communication with said lower pressure chamber being the space defined by the reduced portion of said reciprocating member and a wall of said casing juxtaposed to said reciprocating member.

2. A device for blowing off excess lubricating oil from a high pressure chamber of a hot gas piston engine comprising a casing, a reciprocatory member in said casing, means forming a high pressure chamber at one end of said casing, groove means in the bottom of said high pressure chamber for collecting excess oil coming off said reciprocatory member, channel means in said casing having an inlet in communication with said groove means, said channel means having an outlet opening internally of said casing at a point remote from said high pressure chamber, said reciprocatory member having passageway means therein, said passageway means having inlet means which align with said channel means outlet only when said reciprocatory member is in the top dead center position relative to said high pressure chamber, and outlet means for said passageway means for venting pressure and excess oil therein once each cycle of said reciprocatory member.

3. A lubricating oil blow-off system comprising a hollow cylinder, a reciprocable member slidably mounted therein and having a reduced portion, a high pressure chamber connected into one end of said cylinder, and a lower pressure chamber connected into the other end of said cylinder, oil collection means in communication with said high pressure chamber, drain means connecting said oil collection means to the interior of said cylinder, and passage means in said reciprocable member which connect with said drain means only in one predetermined position of said reciprocable member and with said lower pressure chamber at least in another predetermined position of said reciprocable member, whereby excess oil accumulating in said oil collection means may be blown off from said system once each cycle of said reciprocable member, said passage means comprising the space between the reduced portion of said reciprocating member and a wall of said cylinder juxtaposed to said reciprocating member.

4. The combination comprising casing means defining a pressure chamber, a member reciprocable through said casing means and into said pressure chamber, means for supplying lubricating oil to the surface of said reciprocable member, an oil collection well in said pressure chamber adjacent said reciprocable means, drain means in communication with said oil collection well, said drain means having an outlet opening internally of said casing means at a point remote from said pressure chamber, said reciprocable member having passageway means therein, said passageway means having inlet means which align with said drain means outlet only when said reciprocable member is in the top dead center position relative to said pressure chamber, outlet means in said reciprocable member and connected to said passageway means, said outlet means being positioned so as to be unmasked by said casing means only when said reciprocable member moves away from said top dead center position, and a baffle extending over said oil collection well to a point closely adjacent said reciprocable member for shielding the liquid that may be contained in said well from being directly impinged upon by the pressure gas moving in said pressure chamber but permitting the pressure of said pressure chamber to obtain in said well.

5. The combination comprising casing means defining a pressure chamber, a member reciprocable through said casing means and into said pressure chamber, means for supplying lubricating oil to the surface of said reciprocable member, an oil collection well in said pressure chamber adjacent said reciprocable means, drain means in communication with said oil collection well, said drain means having an outlet opening internally of said casing means at a point remote from said pressure chamber, said reciprocable member having passageway means therein, said passageway means having inlet means which align with said drain means outlet only when said reciprocable member is in the top dead center position relative to said pressure chamber, outlet means in said reciprocable member and connected to said passageway means, said outlet means being positioned so as to be unmasked by said casing means only when said reciprocable member moves away from said top dead center position, and a porous member in said oil collection well and having an edge thereof abutting said reciprocable member.

6. The combination claimed in claim 5 wherein said porous member is felt.

7. A lubricating oil blow-off system comprising a hollow casing, a reciprocable member slidably mounted therein, a pressure chamber attached to one end of said casing, oil collection means in communication with said pressure chamber, drain means connecting said oil collection means to the interior of said hollow casing, a pocket in the wall of said casing, said pocket opening into the interior of said casing, and passage means in said reciprocable member which connect said drain means with said pocket when said reciprocable member is in one position and connect said pocket to the exterior of said casing in another position of said reciprocable member whereby excess oil accumulating in said oil collection means may be blown off from said system once each cycle of said reciprocable member.

8. A lubricating oil blow-off system as claimed in claim 7 wherein said oil collection means comprises a sharp edged portion of said casing for scraping said reciprocable member during the movement thereof.

9. A lubricating oil blow-off system comprising a hollow casing, a reciprocable rod slidably mounted therein, a pressure chamber attached to one end of said hollow casing, oil collection means in communication with said pressure chamber, means for lubricating said reciprocable rod with oil, drain means connected to said oil collection means and opening into the interior of said hollow casing in the region of one end, a first pocket in the wall of said hollow casing, said first pocket opening into the interior of said hollow casing at a point axially displaced from the opening of said drain means into said hollow casing interior and away from said one end, a second pocket in the wall of said hollow casing, said second pocket opening into the interior of said hollow casing at a point axially displaced from the opening of said first pocket in the direction so that said first pocket opening lies between said drain means opening and said second pocket opening, vent means for said hollow casing axially displaced from said second pocket opening in the direction so that said second pocket means is between said first pocket opening and said vent means, said reciprocable rod having passage means, said passage means extending in length a greater distance than either the distance between said drain means opening and said first pocket opening or the distance between said first pocket opening and said second pocket opening, or the distance between said second pocket opening and said vent means, said passage means being so located on said rod so that said drain opening and said first pocket opening are interconnected by said passage means when same rod is in the dead center position closest to said pressure chamber, said first pocket opening and second pocket opening are interconnected by said passage means when said rod is in an intermediate position, and said second pocket opening and said vent means are interconnected by said passage means when said rod is in the dead center position remote from said pressure chamber.

WILLEM VAN HEECKEREN.
GEORGE W. MEADOWS.
BURTON A. JACOBSON.

REFERENCES CITED

The following references are of record in the file of this patent:

UNITED STATES PATENTS

| Number | Name | Date |
|---|---|---|
| 490,526 | Wheeler | Jan. 24, 1893 |
| 648,153 | Serve | Apr. 24, 1900 |
| 754,121 | Brush | Mar. 8, 1904 |
| 945,233 | Hatch | Jan. 4, 1910 |
| 1,006,431 | Cameron | Oct. 17, 1911 |
| 1,846,282 | Summers | Feb. 23, 1932 |
| 2,467,510 | Burg | Apr. 19, 1949 |
| 2,547,957 | Meadows | Apr. 10, 1951 |

FOREIGN PATENTS

| Number | Country | Date |
|---|---|---|
| 1,797 | Great Britain | 1886 |
| 535,309 | France | Jan. 24, 1922 |